United States Patent [19]

McMillin et al.

[11] Patent Number: 5,124,168
[45] Date of Patent: Jun. 23, 1992

[54] PASTA PRODUCT AND METHOD OF MAKING THE SAME

[75] Inventors: Terri W. McMillin, Kansas City, Mo.; Kantha Shelke, Manhattan, Kans.; John Brewer, Lee's Summit, Mo.

[73] Assignee: Tuterri's Incorporated, Kansas City, Mo.

[21] Appl. No.: 654,475

[22] Filed: Feb. 13, 1991

[51] Int. Cl.$^5$ .................................................. A23L 1/16
[52] U.S. Cl. ..................................... 426/557; 426/451
[58] Field of Search ............................... 426/557, 451

[56] References Cited

U.S. PATENT DOCUMENTS

| | | | |
|---|---|---|---|
| 3,728,130 | 3/1973 | Egan | 426/557 |
| 3,762,931 | 10/1973 | Craig et al. | 426/557 |
| 4,178,393 | 12/1979 | Gregersen | 426/557 |
| 4,229,488 | 10/1980 | Suggs et al. | 426/557 |
| 4,539,214 | 9/1985 | Winter et al. | 426/557 |
| 4,659,576 | 4/1987 | Dahle et al. | 426/557 |
| 4,763,569 | 8/1988 | Wenger et al. | 426/451 |
| 4,973,487 | 11/1990 | Wyss et al. | 426/557 |

OTHER PUBLICATIONS

Jarrott et al., The Complete Book of Pasta; Dover Publications, Inc. New York, N.Y. 1975, pp. 28 and 29.

*Primary Examiner*—Donald E. Czaja
*Assistant Examiner*—Mary S. Mims
*Attorney, Agent, or Firm*—Andrus, Sceales, Starke & Sawall

[57] ABSTRACT

A pasta product having enhanced flavor, color and texture characteristics is prepared by mixing dried ingredients including flour and a monoglyceride with eggs, preferably dried egg whites, olive oil, water and flavoring compounds, and extruding the mixture under negative pressure conditions. The preferred flavoring compound is a spice resin. The final pasta preparation may be either fresh or dried. If the pasta preparation is dried, it is dried under a series of conditions to lower the moisture content of the fresh pasta from approximately 30% to approximately 12%.

45 Claims, No Drawings

PASTA PRODUCT AND METHOD OF MAKING THE SAME

FIELD OF THE INVENTION

The present invention relates to an improved pasta formulation and a method of preparing the same. The present invention more specifically is directed to a pasta having a high flavor and color content.

DESCRIPTION OF THE PRIOR ART

The demand for fresh and dried pasta consistently grows as the public is made aware of the beneficial aspects of this food product. Pasta contributes to a balanced diet and eating patterns recommended by the Food and Nutrition Board of the National Academy of Science.

Conventional pasta products include egg noodles, macaroni and spaghetti. Pasta is naturally low in fat, contains no dietary cholesterol, provides complex carbohydrates, some soluble fiber, is low in sodium, and helps contribute to dietary iron intake. The American Heart Association recommends that 60% of dietary intake belong to the family of complex carbohydrates.

There are a variety of pasta products on the market. For example, reference is made to U.S. Pat. No. 4,769,247 to Rothenberq et al., which is directed to a process for adhering spices on the surface of a pasta. The pasta is preheated and conveyed to a rotating, coating reel. Thereafter, a first layer of melted fat is applied to the pasta. The fat coated pasta is then contacted with dry ingredients, after which a second and third layer of fat are added. If desired, vegetable "inlays" can be added between each layer.

U.S. Pat. No. 4,840,808 to Lee et al. is directed to a process for preserving the color and texture of vegetable pasta by adding a cation, such as magnesium, zinc, copper, calcium or aluminum.

U.S. Pat. Nos. 4,803,077 and 4,849,225 to Mitsuhashi et al. disclose a process for preparing a solid product comprising an oil-soluble substance, e. g., oil, fat, spice, flavors, etc.

U.S. Pat. No. 4,915,966 to Guarneri discloses a method for making dried pasta by applying successive applications of heat at progressively higher temperatures.

U.S. Pat. No. 4,120,989 to Grindstaff et al. discloses a process for making a high-protein pasta which does not crack or craze upon drying or storage.

U.S. Pat. No. 4,874,619 to Leonardo et al. discloses a method of making black pasta, in which powdered walnut hull and dried spinach are incorporated into the pasta dough.

Various machines for making or cooking pasta are disclosed in U.S. Pat. No. 4,901,632 to Lori, U.S. Pat. No. 4,869,160 to Pratolonoo, U.S. Pat. No. 4,775,542 to Manser et al., and U.S. Pat. No. 4,763,570 to Bellanca.

Flavored or seasoned pasta has garnered a specialized market within the broad pasta field. It has developed a niche as an accessory dish, upon which a main course may be placed, or as an entree in itself. Prepared correctly, flavored pasta can be consumed without the requirement of a sauce or any supplemental flavorings. As sauces and other flavoring generally incorporate various amounts of fat, cholesterol, sodium and calories, a pasta product which does not require sauces is beneficial. However, many of current pasta products suffer from a variety of deficiencies including texture, color and flavor problems. The current major limitations of the flavored pasta industry include pasta which have weak or insipid flavors, pale colors generally as a result of artificial additives, flavors that are not heat resistant, poor appearance as a direct result of the additives, and poor surface characteristics caused by improper drying of the pasta product.

SUMMARY OF THE INVENTION

The present invention has as an objective, the development of a fresh or dried pasta product with distinct flavors, texture and color characteristics.

The present invention is generally directed to a flare-free pasta product having a homogeneous appearance and which will substantially retain its flavor upon cooking, comprising from about 40.0% to about 80.0% by weight pasta flour, about 1.0% to about 10.0% by weight on a flour weight basis (FWB) eggs, about 0.2% to about 5.0% (FWB) starch complexing agent, olive oil in an amount sufficient to facilitate the extrusion of the pasta product and to bind the non-pasta flour ingredients to the pasta flour in a homogeneous manner throughout the pasta product, and water in an amount sufficient to blend the ingredients together.

The invention is specifically directed to a high quality pasta product having excellent texture, color and flavor characteristics, comprising from about 40.0% to about 80.0% flour, from about 1.0% to 3.0% (FWB) eggs, from about 0.5% to 1.2% (FWB) monoglyceride, from about 1.0% to 5.0% by weight olive oil, and water sufficient to blend the ingredients together.

The present invention is also directed to a method of preparing a pasta product having a homogeneous flare-free texture, and which will substantially retain its flavor upon cooking. The method includes the steps of first mixing the following ingredients together to form a pasta blend: about 40.0% to about 80.0% by weight of a pasta flour; about 1.0% to about 10.0% (FWB) eggs; and about 0.2% to about 5.0% (FWB) of a starch complexing agent. Additionally, liquid ingredients including olive oil in an amount sufficient to facilitate the extrusion of the pasta product and to bind the non-pasta flour ingredients to the pasta flour in a homogeneous manner throughout the pasta product, and water in an amount sufficient to blend the ingredients together are blended into the mixture. The final pasta dough is then extruded to form a pasta product.

The present invention is also directed to a method of making the pasta product, comprising dry-blending the dry ingredients including flour and flavoring compounds in a pre-mixer, dispersing an emulsion of liquid ingredients including olive oil, seasoning and spice extracts, and water, with the dry mixture, mixing the dried ingredients and emulsion together, and extruding the mixture under conditions to protect the color and flavor of the pasta formulation.

The product of the extrusion is then ready for consumption following standard cooking techniques known to the art. Additionally, the extruded product may be dried in a controlled environment to protect and enhance the product integrity.

Advantageously, the process of the present invention yields a pasta with unique characteristics. The pasta of the present invention has the appearance and cooking quality characteristics of premium pasta, i.e., fine surface characteristics. Of extreme importance, the pasta of the present invention, after it is cooked, has the taste and aroma of selected seasonings and vegetables. The pasta remains brightly colored, having the color of the predominant ingredient, i.e., a green color for spinach, red for beets, black for calamari, etc. When dried, the pasta has a longer shelf life than flavored pasta products currently in the market.

DETAILED DESCRIPTION OF THE INVENTION

In general, the ingredients used in the pasta of the present invention are selected for freshness and quality. Although many of the ingredients are familiar to those skilled in the art of making pasta, the pasta product of the present invention is unique in that it is derived from a unique combination of specific ingredients and a unique production design. Except as indicated, all percentage formulations are on a flour weight basis, known to the art and referred to herein as "FWB."

Pasta Ingredients

Flour

The pasta of the present invention is predominantly comprised of farinaceous starch-containing materials. There are a variety of farinaceous materials which can be used, such as semolina, durum flour, farina, flour, such as all purpose flour, and combinations of these. For purposes of the present invention and unless otherwise stated, the farinaceous materials utilized in the present invention will be collectively called "pasta flour."

While any of the above-mentioned pasta flour products may be used, the present invention prefers the incorporation of fine grade semolina flour into the pasta dough. Semolina is the coarsely ground endosperm of durum wheat. Although durum flour per se is not preferred as it has an inherently high starch damage level and poor extrusion properties, it could feasibly be used. By U.S. standards of identity developed by the Federal Codex Alimentarius, only 3% (by weight) semolina should be passable through a U.S. sieve number 100. The pasta dough of the present invention includes at least 40.0% by weight of the pasta flour, with an amount of at least 75.0% by weight being preferred.

Dehydrated Vegetables

Another dried ingredient, which is preferably used in all pasta formulations except the calamari (squid) flavor, ginger garlic, and classico (plain) pastas is dehydrated vegetable. While the pasta product of the present invention may include fresh vegetables and vegetable purees, dehydrated vegetables are preferred for a number of reasons.

Dehydrated vegetables, instead of fresh vegetables, assure a uniform moisture content and make water absorption calculations more precise. Dehydrated vegetables, by virtue of their low moisture content are insured against microbial growth and spoilage. This is of particular importance in fresh pasta products which are susceptible to microbial spoilage during handling, if the temperature is not low enough. The dehydrated vegetables selected for use in the pasta formulation of the present invention are preferably dried under special controlled conditions, i. e., cryogenic dehydration or lyophilization.

Eggs

Eggs are also used as an ingredient in the pasta formulation of the present invention. Although whole eggs or the egg white from whole eggs can be used, it is preferred to incorporate dehydrated egg whites into the pasta of the present invention. The use of dried egg white is preferred because it is easier to control the measurement and use of the dried product as opposed to the whole egg product, it results in a final pasta product which is easier to store, and dried egg whites do not run the risk of health hazards, such as botulism, etc., sometimes found with the use of fresh whole eggs.

Olive oil

Another required component of the pasta product of the present invention is olive oil, which is important as a processing aid and for organoleptic, i.e., mouth feel, functionality. The use of a relatively small amount of olive oil in the pasta formula assists in a more uniform dispersal of the pasta ingredients, which consequently imparts uniform flavor, texture and consistency to the finished pasta product. Olive oil is present in the pasta formula of the present invention in an amount between about 1.0% and 5.0%, and preferably in an amount between 2.0% and 3.0%.

Olive oil is also important for flavored pasta products. Olive oil carries fat-soluble flavor components of the dehydrated vegetables and spice resins, which are described hereinafter. Olive oil also facilitates the extrusion of mixtures containing hygroscopic materials, such as tomato and lemon powders. It disperses flavors, enhances the impact of fat-soluble flavors, and binds these flavoring compounds with the flour in a homogeneous manner throughout the pasta formulation.

Without wishing to be limited to a particular explanation, it is believed that olive oil coats the "rough edges" of the pasta flour particles and renders the surface slippery. The resulting pasta dough can consequently pass through an extruder auger and die with relatively more ease. Olive oil also incorporates a distinct flavor to the pasta product. Alternative vegetable oils, which have profiles similar to olive oil, may also be used. A representative example is safflower oil.

Water

Another required ingredient in the pasta formulation of the present invention is water, which is used for assisting the mixing of the dried ingredients and enabling the dried ingredients to be extruded. The amount of water added depends on the moisture of the non-pasta flour ingredients.

Starch complexing agents

Starch complexing agents, such as glyceryl monostearate, and mono- and di-glycerides and combinations thereof are also added to the formulation of the present invention as an aid to dispersing the component parts of the pasta dough, to enhance surface active properties and to bring uniformity of flavor and color components. The primary purpose for including starch complexing agents in the pasta dough is for improvement of texture. The resulting pasta will have an increased resistance to overcooking and mushy texture. While not wishing to be restricted to one explanation, it is believed that complexing agents coat the flour particles with a hydrophobic film. The film deters the rapid entry of water, and thereby protects the "al dente" texture and the surface from becoming overcooked.

The presence of complexing agents, along with the presence of olive oil, renders the pasta surface smooth and the cooked texture "al dente." Further, the translucency of the strands is enhanced.

A preferred starch complexing compound for the present invention is a monoglyceride mixture, such as Paniplex ®. The starch complexing compound is present in an amount of between about 0.2% and about 5.0% (FWB), preferably about 0.5% and 1.2% (FWB).

Flavor components

With the exception of classico (plain) pasta, flavor components are added to the pasta dough of the present invention. It is to be noted, however, that classico pasta has a distinct flavor, generally a result of the incorporation of olive oil into the pasta dough.

Unlike current flavored pasta products in which the flavor tends to disappear as the pasta is being prepared (generally by boiling), the combination of ingredients in the pasta dough of the present invention "locks in" the flavoring components. The result is pasta product which carries a stronger, more distinct flavor.

A non-limiting list of examples of flavor components, or combinations thereof, include tomato, parsley, calamari (squid), lemon, garlic, curry, carrot, porcini, mushroom, black pepper, beet, onion, basil, ginger, saffron, lime, sage, spinach, dill, cilantro, serrano, green pepper, and tarragon. A non-limiting list of preferred pasta blends includes porcini mushroom, cepe mushroom, lemon dill, spinach, curry carrot, tarragon, tomato parsley, basil, saffron, beet onion, ginger garlic, calamari, serrano pepper, and lime sage.

Flavor ingredients for use in the present invention may originate from a variety of sources such as, dried or fresh seasonings, commonly available as cooking products. Dried seasonings are generally added to the blend in powder form in amounts ranging from 0.5% to 10.0% (FWB). The quantity of seasoning added to the blend depends on the type of seasoning, the strength of the seasoning, and the palate of the consumer.

While the dried or fresh seasonings described in the previous paragraph can be used in the pasta dough, the preferred flavoring compounds are flavor components extracted directly from fruits, spices, vegetables, animals or the like. These compounds are collectively referred to as "flavor resins." Because flavor components are extremely volatile, the flavor of the food product will naturally dissipate in the air as soon as it is activated. To avoid this, flavor compounds are combined with a neutralizing base component, which acts to encapsulate or capture the essence, i. e., aroma and/or taste, of the particular food product. The flavor essence thereby remains with the pasta dough throughout the processing and cooking of the pasta, only to be released when it is consumed.

Preferred flavor resins for the present invention are suspended in oil, such as refined soybean oil or corn oil, thereby causing the flavor components to adhere to the oil molecules. By combining the flavor components with an oil base, the flavor molecule now becomes too large to dissipate into the air. Because the flavor resins are encased in an oil base, as opposed to water, the flavor component holds up well in pasta even after the pasta has been cooked. Flavor resins are known to the art. However, until the process of the present invention was developed, the satisfactory incorporation of flavor resins into pasta products, which results in a product having distinct flavor, had not been achieved.

An example of a flavor resin, which can be incorporated into the pasta dough of the present invention, is produced by Fritzche, Dodge & Olcott under the name E-Z Resin ® and described in La Bell, F., Jul. 1988, "Natural Flavors Add 'Spice' to Pasta," Food Processing, p. 82. Examples of spice flavors which may be used in the pasta dough of the present invention include basil, pesto, garlic, pizza spice, marinara spice, capsicum, celery, coriander, cumin, dill seed, fennel, marjoram, mustard, onion, oregano, black pepper, and rosemary.

An alternative flavor resin product, which is suitable for the pasta dough of the present invention, is made by Milwaukee Seasoning Laboratories, Inc., Germantown, Wis. 53022.

Flavor resins are added to the pasta dough in amounts ranging from about 0.1% to about 3.0% (FWB), and preferably about 0.3% to about 1.0% (FWB). As with the powdered seasonings, the amount of flavor resin added to the pasta dough again depends upon the type of seasoning, the strength of the seasoning, and the palate of the consumer. It is also within the scope of the present invention to combine one or more sources of flavorings depending upon the desired outcome of the pasta. Thus, blends of dried or powdered seasonings and flavor resins are acceptable and preferred.

Proportions of Ingredients

As discussed below, the proportions of each of the ingredients will vary depending upon the flavor of pasta to be produced and the mixing and extrusion conditions.

The dried and liquid ingredients are mixed such that the pasta formulation has a moisture content of between about 26% and 35%, preferably about 30%. The amount of water added to the formulation is based on the moisture content of the ingredients previously added together. Because olive oil has no water, an allowance is made for that. Dried egg white generally has a moisture content of about 3%. When the product is to be extruded, it should be extruded at a moisture content of between about 26% and 35% moisture, preferably about 30% moisture.

The preferred amount of absorption depends upon the type of extruder, the nature of the product being extruded and the temperature of extrusion. The higher the temperature, the less water needed. If the temperature is lowered, more water will be needed.

The end product should have an extruded moisture content of about 26% to 35%. To achieve this goal, there are several factors to consider. First the water content of each of the ingredients must be determined going into the mixture. Second, the type of extruder affects the water content of the extruded pasta. The extruder features include the rate of extrusion and the temperature of extrusion.

The benefit of the water jacket is that it will provide a more unified extrusion rate.

GENERAL CONDITIONS FOR MIXING AND EXTRUSION

It is within the scope of the present invention to produce a pasta product having enhanced flavor, color and texture by mixing the required dry ingredients and then blending in the liquid ingredients in a conventional mixer under conventional conditions known to the art. The incorporation of the essential ingredients, as described above such as pasta flour, olive oil, water, and starch complexing ingredients, in the appropriate amounts will result in the desired pasta product.

The dry and liquid ingredients are blended to a conventional particulate size and introduced to an extruder.

The particulate size of the blended ingredients is about 0.7±0.2 cm in diameter. It is important not to mx the ingredients too thoroughly as overmixing tends to result in an inferior pasta product.

The following section describes the best or preferred mode of preparing the pasta product of the present invention. Many of the steps described hereinafter are intended to be cumulative. By this it is meant that one or more of the described steps can be added to the basic preparation recipe described above. The incorporation of these steps will result in further improvements in the color, appearance, flavor and texture of the pasta product of the present invention.

Best Mode

The preferred mode of preparing the pasta product of the present invention includes the following basic steps:
1) mixing the dry ingredients in correct proportions;
2) blending the liquid ingredients with the dry ingredients;
3) extruding the blend of step 2); and
4) optionally, drying the extruded blend.

Dry Mixing

Prior to adding any liquid ingredients, the dry ingredients are mixed together in proportions depending upon the resulting flavor and texture of the pasta product. The dry ingredients include flour, the starch complexing agents, and any of the necessary dry seasonings and flavor additives depending on the desired flavor of the pasta product.

The dry ingredients are preferably mixed in a pasta mixer. Without wishing to restrict the present invention in any way, a representative example of a suitable mixer, which may be used for dry mixing and subsequent blending of the liquid ingredients with the dry ingredients, is a Hobart 60 ® mixer.

Wet Blending

After the dried ingredients have been thoroughly mixed, the liquid ingredients are added to the dry mixture. As stated above, the liquid ingredients include water, olive oil and any of the liquid flavorings required for the resulting flavor of pasta product. A suitable technique for adding the liquid ingredients is by spray application while the mixer is operating.

Prior to adding any of the liquid ingredients to the mixture of dried ingredients, water is preferably heated to a temperature between about 104° and 176° F. (40° and 80° C.), preferably between about 104° and 149° F. (40° and 65° C.). The purpose of heating the water is to increase the mobility of the liquid fraction during blending. Increased mobility assures an even hydration with a subsequent substantial reduction in time and energy spent to achieve a homogenous mixture. The liquid ingredients are then blended together to form an emulsion.

After both the dry and liquid ingredients have been prepared, the liquid emulsion is dispersed thoroughly into the mixer containing the dry ingredients in a micrometrically adjustable feeder apparatus to obtain a granular mixture. During the mixing stage, the addition of water is often adjusted so that maximum dispersion is achieved. The term "micrometrically adjustable" refers to the capability of controlling the addition of the liquid ingredients at the millimeter level to enable exact proportions and formulations and therefore reproducibility of quality between batches.

The purpose of the mixing and blending stage is to blend everything together, but not to form a developed dough end product. The preferred end product will have a nodular appearance with a mean particle diameter of approximately 0.7±0.2 cm. If the product is overmixed, i.e., mixed beyond the preferred time, the consistency of the pasta product resulting therefrom will be imperfect.

The mixing stage is preferably conducted in a vacuum or negative pressure atmosphere, which is described in the following section. Extrusion:

After the pasta dough has been properly mixed and blended, it is taken to the next station, the extruder station.

Non-limiting examples of suitable extruders for use in the present invention include a Wenger brand extruder. The type of extruder used will determine the amount of starting ingredients. Preferably, the extruder is modified such that the extrusion steps are conducted under negative pressure and at a preset temperature.

Negative pressure involves the use of a compressor to evacuate the atmosphere of both the mixing and extrusion chambers. The pressure is maintained at approximately 18 millimeters (mm) mercury (Hg). The use of negative pressure aids in the formation of "flare-free" brightly colored products. Flare spots are areas of weakness in the pasta strand caused by entrapped air bubbles in the pasta strand, during the extrusion process, which are to be avoided. The air bubbles expand slightly during the drying cycle, giving the appearance of white or light colored flares in the pasta strands. The lighter color is the result of decreased translucency of the spots. Flare spots are also mechanically weak spots in the strands. Thus, extruding the product under negative pressure will yield a product with fine surface and texture characteristics. The surface of the pasta strand should be shiny and smooth. The texture should be firm to the bite when cooked, i.e., al dente. Further, when dried, the strands should be supple enough to be bent up to a 45° angle before breaking. A noticeable "snap" sound should also be apparent when the strands are broken.

The standard extruder is also modified by cooling the auger of the extruder with a water jacket so that the extruder always operates at temperature of about 13° F. (45° C.), which has been determined to be the best extrusion temperature for the formulations of the present invention. If the pasta is unseasoned, i.e., without a flavor, the extrusion temperature could be elevated to approximately 155° F. (50° C.).

In operation, the pasta formulation is placed in the pasta dough fill chamber of the extruder and the extruder is activated. Additionally, a negative pressure vacuum is created as described above. The fill chamber is then rotated according to normal procedures known to the art and the pasta dough is urged to a rotating auger to advance the blend to and through a die having extrusion openings. The size and shape of the extrusion openings will determine the type of pasta product being prepared.

As the pasta dough is advanced through the auger and die, the auger is maintained at the previously described constant temperature by the water jacket. A metering valve adjusts the temperature of the water passing through the water jacket to maintain the preset temperature. This temperature may be varied slightly depending upon the texture and type of noodle that is being processed.

The mixing and extrusion steps are preferably conducted in an area of reduced lighting in order to prevent color bleaching by the action of the enzymes lipoxygenase, polyphenoloxidase, and lipase, which are sometimes present in the pasta dough. Lipoxygenase acts in the presence of light and oxygen (air) to reduce the color components in the formulation. By adding a cover to the mixer, the exposure to both light and air is reduced. Similarly, polyphenoloxidase and lipase actions are hampered. Lighting benefits can also be achieved by adding a lighting filter, such as a red filter, to the light source.

Fresh Pasta

After the product has been extruded, it is ready for consumption as fresh pasta. The moisture content of fresh content is preferably about 30%, with a range from about 26% to about 35%. The fresh pasta would require about three and a half minutes to cook in boiling water to obtain ideal palatability.

A limitation of fresh pasta is that it does not have a long shelf life and it must be refrigerated. A pasta product with a 30% moisture content will normally have a shelf life of only approximately 2-3 days. The shelf-life can be extended by cold or refrigerated storage.

Fresh pasta may also be stored for up to 30 days without the requirement for refrigeration prior to shipment by modifying the atmosphere prior to packaging the pasta.

Pasta Curing or Drying Process

In order to extend the shelf life of pasta, it may be dried or cured. Although the term "drying" as a term of art is predominantly used in the pasta-making process, it is somewhat of a misnomer. Pasta is not completely dried. Rather, the moisture content is reduced from approximately 30% after extrusion to about 12%. For purposes of the present invention, a pasta product with an approximately 12% moisture content is considered a "dried" or "cured" pasta product. At this point, it has a substantial shelf life extending to eight or nine months and beyond.

The exact temperature and humidity details of the drying process vary between the pasta product and the season of the year. In general, the drying cycle utilizes a maximum temperature of between about 136° and 158° F. (58°-70° C.) to protect the organoleptic properties of the formulations.

While standard drying methods known to the art may be used to dry the pasta product of the present invention, a preferred drying process includes four distinct stages:
1) initial pre-drying;
2) pre-drying;
3) drying; and
4) post-drying.

Initial Pre-Drying:

The initial pre-drying stage occurs out of the drying room. In this stage, the freshly extruded strands of pasta are generally hung on a rack prior to the drying stage. This is achieved by drawing out the extruded strand a certain length, separating it from the extruder and simply hanging it on a horizontal rod attached to a drying rack. Preferably, the extruded strands are drawn to a length of approximately 32" and doubled to provide a doubled 16" strand. In order to avoid any damage to the freshly-extruded pasta, the extrusion room, i. e., the room in which the extruders are placed, is maintained at a predetermined, optimal temperature and humidity. While the temperature and humidity conditions may change, depending on factors such as outside temperature and season of the year, the preferred temperature is approximately 86° F. (30° C.) and the preferred humidity is approximately 85%.

Pre-Drying

The pre-drying stage occurs while the drying room is being loaded. The practical reason for the pre-drying stage is that the drying room must be loaded, which may take up to four hours, depending upon the size of the drying room. During that time, the temperature and humidity conditions are set as described in the previous paragraph.

Drying Stage

After the pre-drying stage, i.e., when the drying room has been filled, the drying stage is activated. This stage is accomplished in several substages with definite temperature, relative humidity and time variables. Generally, the drying cycle is accomplished within a 14 to 15 hour period.

The initial phase of the drying stage includes a "case hardening" stage in which the extruded pasta product is subjected to a draft of air to set the exterior shape of the pasta product.

The pasta is then subjected to high humidity conditions to cause the pasta to "sweat." Sweating is a term of art in the pasta business, which defines the result of the migration of the moisture from within the pasta product to the exterior surface. In this stage, the humidity of the drying room is raised to approximately 92%. The temperature is gradually raised to approximately 158° F. (70° C.), after which it is lowered to around 130° F. (55° C.) and held at that temperature for approximately two hours. After that, the temperature is lowered to approximately 85° F. (30° C.) over a twelve hour period. The humidity also lowers in proportion to the drop in temperature.

The drying stage is intended to bring the moisture content of the pasta product down from 30% to approximately 12% in a period of approximately 14 to 15 hours.

Post Drying

After the drying phase, the pasta is equilibrated to ambient temperature and humidity.

Drying Room

A specialized pasta drying room has been developed to accommodate the preferred temperature, time and humidity requirements for drying pasta. The drying room is computerized and programmed to dry the product to exact moisture levels in order to promote an indefinite shelf life and guarantee that the moisture content in the pasta will be evenly dispersed.

The preferred drying room of the present invention is a static drying room.

The air is alternatively drafted horizontally from one side of the room to the other for better distribution.

The room is controlled by sensors that measure both temperature and humidity simultaneously. The sensors measure the relative humidity and temperature precisely. The control panel is specifically designed for the room.

Temperature and humidity react strangely when they are combined. When temperature goes up, the humidity tends to decrease. Thus, if 85% humidity at 50° C. is desired, a certain amount of water will be inserted. But if the temperature is higher, the amount of water that goes in to maintain the same humidity is greater. Thus, the control panel is a programmable logic controller. It determines the temperature and the prescribed humidity and combines the two measurements to produce a desired condition.

Post-Drying

After the pasta product has been dried, it is taken from the drying room. If the pasta is in the form of strands, the bends remain intact. It is then packaged, preferably in polypropylene bags to protect the pasta from moisture transfer and eliminate the transfer of seasonings, flavors and aromas from one product to another on the shelf.

EXAMPLES

The following examples are intended to more fully illustrate the invention without limiting the same. The following examples are directed to "recipe formulations" of various flavor blends of the pasta product of the present invention. The numbers following the ingredients indicate the weight of the ingredient on an as is basis.

Example 1

Beet Onion

The composition of the dry ingredients is listed in the following table:

| Semolina | 15,750 g |
|---|---|
| Dried Egg White | 300 g |
| Paniplex (monoglyceride) | 150 g |
| Beet powder | 800 g |

The dry ingredients are mixed in an industrial pre-mixer for 5 minutes.

The composition of the liquid ingredients is listed in the following table:

| Water (reserve) | 450 g |
|---|---|
| Olive Oil | 300 g |
| Onion oil (Fritzche, Dodge & Olcott) | 100 g |

After the water is heated as previously described, the liquid ingredients are whisked together to form an emulsion. The emulsion is sprayed at a rate of 100 ml per minute to blend into the mixture of dry ingredients while the dry ingredients are still being mixed in the premixer. After the emulsion has been blended with the dry ingredients, the mixture is allowed to rest for 15 minutes.

The mix is then transferred to a vacuum mixer, the atmospheric pressure in the mixer vessel is lowered to 18 mm Hg, and the mixing is continued under reduced pressure until the pasta dough has a granular appearance with a nodular size of approximate 0.7 cm in diameter. The pasta dough is then extruded in a standard extruder under a negative or reduced pressure of 18 mm Hg.

Example 2

Basil

The process of Example 1 was followed using the following ingredients:

| Dry Ingredients | |
|---|---|
| Semolina | 14,250 g |
| Dried Egg White | 300 g |
| Paniplex (monoglyceride) | 120 g |
| Basil powder | 700 g |
| Liquid Ingredients | |
| Water (reserve) | 450 g |
| Olive Oil | 300 g |
| Basil oil | 70 g |
| Onion oil | 100 g |

Example 3

Calamari

The process of Example 1 was followed using the following ingredients:

| Dry Ingredients | |
|---|---|
| Semolina | 15,750 g |
| Dried Egg White | 300 g |
| Paniplex (monoglyceride) | 100 g |
| Liquid Ingredients | |
| Water (reserve) | 450 ml |
| Olive Oil | 300 g |
| Calamari | 440 g |
| Lemon Oil | 75 g |
| Garlic oil | 35 g |

Example 4

Cayenne Pepper

The process of Example 1 was followed using the following ingredients:

| Dry Ingredients | |
|---|---|
| Semolina | 13,635 g |
| Dried Egg White | 300 g |
| Paniplex (monoglyceride) | 150 g |
| Paprika | 1200 g |
| Red cayenne powder | 300 g |
| Liquid Ingredients | |
| Water (reserve) | 450 ml |
| Olive Oil | 300 g |
| Onion Oil | 25 g |

Example 5

Cilantro

The process of Example 1 was followed using the following ingredients:

| Dry Ingredients | |
|---|---|
| Semolina | 15,750 g |
| Dried Egg White | 300 g |
| Paniplex (monoglyceride) | 150 g |
| Liquid Ingredients | |
| Water (reserve) | 450 g |
| Olive Oil | 300 g |
| Cilantro oil | 75 g |

Example 6

Classico

The process of Example 1 was followed using the following ingredients:

| Dry Ingredients | |
|---|---|
| Semolina | 16,200 g |
| Dried Egg White | 300 g |
| Paniplex (monoglyceride) | 100 g |
| Liquid Ingredients | |
| Water (reserve) | 450 g |
| Olive Oil | 300 g |

Example 7

Curry Carrot

The following process of Example 1 was followed using the following ingredients:

| Dry Ingredients | |
|---|---|
| Semolina | 15,750 g |
| Dried Egg White | 300 g |
| Paniplex (monoglyceride) | 150 g |
| Carrot Powder | 1,325 g |
| Curry Powder | 400 g |
| Liquid Ingredients | |
| Water (reserve) | 450 g |
| Olive Oil | 300 g |
| Curry oil | 60 g |

Example 8

Ginger Garlic

The following process of Example 1 was followed using the following ingredients:

| Dry Ingredients | |
|---|---|
| Semolina | 15,750 g |
| Dried Egg White | 300 g |
| Paniplex (monoglyceride) | 100 g |
| Liquid Ingredients | |
| Water (reserve) | 450 ml |
| Olive oil | 300 g |
| Ginger oil | 22.5 g |
| Garlic oil | 45 g |

Example 9

Lemon Dill

The following process of Example 1 was followed using the following ingredients:

| Dry Ingredients | |
|---|---|
| Semolina | 15,750 g |
| Dried Egg White | 300 g |
| Paniplex (monoglyceride) | 150 g |
| Dehydrated Dill Flakes | 100 g |
| Liquid Ingredients | |
| Water (reserve) | 450 ml |
| Olive Oil | 300 g |
| Lemon Oil | 75 g |
| Dill Oil | 25 g |

Example 10

Lime Sage

The following process of Example 1 was followed using the following ingredients:

| Dry Ingredients | |
|---|---|
| Semolina | 15,750 g |
| Dried Egg White | 300 g |
| Paniplex (monoglyceride) | 150 g |
| Sage Powder | 385 g |
| Liquid Ingredients | |
| Water (reserve) | 450 ml |
| Olive Oil | 200 g |
| Lime Oil | 75 g |
| Sage oil | 50 g |

Example 11

Porcini Mushroom

The following process of Example 1 was followed using the following ingredients:

| Dry Ingredients | |
|---|---|
| Semolina | 14,250 g |
| Dried Egg White | 300 g |
| Paniplex (monoglyceride) | 120 g |
| Mushroom | 500 g |
| Porcini | 700 g |
| Liquid Ingredients | |
| Water (reserve) | 450 ml |
| Olive Oil | 300 g |
| Black pepper Oil | 10 g |

Example 12

Saffron

The following process of Example 1 was followed using the following ingredients:

| Dry Ingredients | |
|---|---|
| Semolina | 15,750 g |
| Dried Egg White | 300 g |
| Paniplex (monoglyceride) | 150 g |
| Saffron | 80 g |

Saffron was placed in 300 ml water at 40° C. for 20 minutes to release the flavor and color compounds.

| Liquid Ingredients | |
|---|---|
| Water (reserve) | 450 ml |
| Olive Oil | 300 g |

Example 13

Serrano Pepper

The following process of Example 1 was followed using the following ingredients:

| Dry Ingredients | |
|---|---|
| Semolina | 13,635 g |
| Dried Egg White | 300 g |
| Paniplex (monoglyceride) | 150 g |
| Green Bell Pepper | 1,200 g |
| Serrano | 300 g |

-continued

| Liquid Ingredients | |
|---|---|
| Water (reserve) | 450 ml |
| Olive Oil | 275 g |
| Onion oil | 25 g |

Example 15

Spinach

The following process of Example 1 was followed using the following ingredients:

| Dry Ingredients | |
|---|---|
| Semolina | 14,250 g |
| Dried Egg White | 300 g |
| Paniplex (monoglyceride) | 120 g |
| Dehydrated Ground Spinach | 800 g |
| Liquid Ingredients | |
| Water (reserve) | 450 ml |
| Olive Oil | 300 g |
| Onion oil | 100 g |
| Garlic oil | 35 g |

Example 16

Tarragon

The following process of Example 1 was followed using the following ingredients:

| Dry Ingredients | |
|---|---|
| Semolina | 15,750 g |
| Dried Egg White | 300 g |
| Paniplex (monoglyceride) | 150 g |
| Tarragon Powder | 775 g |
| Liquid Ingredients | |
| Water (reserve) | 450 ml |
| Olive Oil | 300 g |
| Tarragon Oil | 77 g |
| Onion oil | 110 g |

Example 17

Tomato Parsley

The following process of Example 1 was followed using the following ingredients:

| Dry Ingredients | |
|---|---|
| Semolina | 13,650 g |
| Dried Egg White | 300 g |
| Paniplex (monoglyceride) | 150 g |
| Dehydrated Tomato Powder | 1,200 g |
| Dehydrated Parsley Flakes | 60 g |
| Liquid Ingredients | |
| Water (reserve) | 450 ml |
| Olive Oil | 300 g |
| Onion oil | 18 g |

It is understood that the invention is not confined to the particular construction and arrangement herein described, but embraces such modified forms thereof as come within the scope of the following claims.

We claim:

1. A flare-free, translucent pasta product having a homogeneous texture and which will substantially retain its flavor upon cooking, comprising the following ingredients:

a. from about 40% to about 80% by weight pasta flour;
  b. from about 1.0% to about 10% (FWB) eggs;
  c. from about 0.2% to about 5.0% (FWB) starch complexing agent;
  d. olive oil in an amount sufficient to facilitate the extrusion of the pasta product and to bind the non-pasta flour ingredients to the pasta flour in a homogeneous manner throughout the pasta product; and
  e. water in an amount sufficient to blend the ingredients together.

2. The pasta product of claim 1 wherein the pasta flour is selected from the group consisting semolina, durum flour, farina, flour, including all-purpose flour, and combinations thereof.

3. The pasta product of claim 1 wherein the pasta flour is semolina.

4. The pasta product of claim 1 further comprising at least one dehydrated vegetable in an amount sufficient to assure uniform moisture content in the pasta product.

5. The pasta product of claim 1 wherein the eggs are selected from the group consisting of whole eggs or parts thereof, and dehydrated egg whites.

6. The pasta product of claim 1 wherein the olive oil is present in an amount between about 1.0% and 5.0% by weight.

7. The pasta product of claim 1 wherein the olive oil is present in a preferred amount between about 2.0% and 3.0% by weight.

8. The pasta product of claim 1 wherein the starch complexing agent is selected from the group consisting of glyceryl monostearate, monoglycerides, diglycerides, and combinations thereof.

9. The pasta product of claim 1 wherein the starch complexing agent is present in an amount from about 0.2% to about 5.0% (FWB).

10. The pasta product of claim 1 wherein the starch complexing agent is a monoglyceride.

11. The pasta product of claim 1 further comprising at least one flavor component in an amount dependent upon the type of flavor component and the strength of the flavor component.

12. The pasta product of claim 11 wherein the flavor component includes a dried seasoning present in an amount from about 0.5% to about 10.0% (FWB).

13. The pasta product of claim 11 wherein the flavor component is selected from the group consisting of tomato, parsley, calamari (squid), lemon, garlic, curry, carrot, porcini, mushroom, black pepper, beet, onion, basil, ginger, saffron, lime, sage, spinach, dill, cilantro, serrano, green pepper, tarragon and combinations thereof.

14. The pasta product of claim 11 wherein the flavor component includes at least one flavor, resin.

15. The pasta product of claim 14 wherein the flavor resin includes flavors selected from the group consisting of basil, pesto, garlic, pizza spice blend, marinara spice blend, capsicum, celery, coriander, cumin, dill seed, fennel, marjoram, mustard, onion, oregano, black pepper, rosemary and combinations thereof.

16. The pasta product of claim 14 wherein the flavor resin is present in the pasta product in an amount from about 0.1% to about 3.0%.

17. The pasta product of claim 1 which has a moisture content between about 26% and about 35%.

18. The pasta product of claim 1 which has a moisture content of about 30%.

19. The pasta product of claim 1 which has a moisture content of about 12%.

20. A flare-free, translucent pasta product having a homogeneous texture, and which will substantially retain its flavor upon cooking, comprising the following ingredients:
   a. from about 40% to about 80% by weight semolina flour;
   b. from about 1.0% to about 10.0% (FWB) dried egg whites;
   c. from about 0.2% to about 5.0% (FWB) starch complexing agent;
   d. at least one flavor component in an amount dependent upon the type of flavor component and the strength of the flavor component;
   e. at least one dehydrated vegetable in an amount sufficient to provide uniform moisture content to the pasta product
   f. from about 1.0% to about 5.0% olive oil; and
   g. water in an amount sufficient blend the ingredients together.

21. The pasta product of claim 20 wherein the olive oil is present in an amount from about 2.0% to about 3.0% by weight.

22. The pasta product of claim 20 wherein the flavor component includes a flavor resin in an amount between about 0.1% and about 3.0% by weight.

23. The pasta product of claim 22 wherein the flavor resin includes flavors selected from the group consisting of basil, pesto, garlic, pizza spice blend, marinara spice blend, capsicum, celery, coriander, cumin, dill seed, fennel, marjoram, mustard, onion, oregano, black pepper, rosemary and combinations thereof.

24. A method of preparing a translucent pasta product having a homogeneous flare-free texture, and which will substantially retain its flavor upon cooking, comprising:
   a. blending the following ingredients together in an atmosphere of negative pressure to form a pasta dough:
      i. non-liquid ingredients including from about 40% to about 80% by weight pasta flour, from about 1.0% to about 10.0% (FWB) eggs; and from about 0.2% to about 5.0% (FWB) starch complexing agent; and
      ii. liquid ingredients including olive oil in an amount sufficient to facilitate the extrusion of the pasta product and to bind the non-pasta flour ingredients to the pasta flour in a homogeneous manner throughout the pasta product, and water in an amount sufficient blend the ingredients together; and
   b. extruding the blend if step a.

25. The method of claim 24, wherein the eggs are dried egg whites and the ingredients of category a.i. are dry ingredients.

26. The method of claim 24, wherein step a. further comprises:

a.1) mixing the dry ingredients together; and
   a.2) thereafter adding the liquid ingredients to the mixture of step a.1).

27. The method of claim 26 wherein the liquid ingredients are blended together to form an emulsion.

28. The method of claim 27 wherein the emulsion is heated to a temperature between about 90° and 140° F. prior to adding the liquid ingredients to the dry mixture.

29. The method of claim 24 wherein the pressure is maintained at approximately 18 mm Hg.

30. The method of claim 24 wherein mixture of step a. is extruded in an atmosphere of negative pressure.

31. The method of claim 30 wherein the pressure is maintained at approximately 18 mm Hg.

32. The method of claim 24 wherein the blend is extruded under conditions in which the temperature of the extruded blend in maintained at a temperature between about 110° F. and about 120° F.

33. The method of claim 24 wherein the mixing and extrusion steps are conducted under reduced lighting conditions.

34. The method of claim 24 wherein the pasta flour is selected from the group consisting semolina, durum flour, farina, flour, including all-purpose flour, and combinations thereof.

35. The method of claim 24 wherein the pasta flour is semolina.

36. The method of claim 24 wherein the ingredients of category a.i. further comprise at least one dehydrated vegetable in an amount sufficient to provide uniform moisture content to the pasta product.

37. The method of claim 24 wherein the olive oil is present in an amount between about 2.0% and 3.0% by weight.

38. The method of claim 24 wherein the starch complexing agent is selected from the group consisting of glyceryl monostearate, monoglycerides, diglycerides, and combinations thereof.

39. The method of claim 24 wherein the starch complexing agent is present in an amount from about 0.5% to about 1.2% (FWB).

40. The method of claim 24 wherein the starch complexing agent is a monoglyceride.

41. The method of claim 24 wherein the ingredients of category a.i. further comprise at least one flavor component in an amount dependent upon the type of flavor component and the strength of the flavor component.

42. The method of claim 41 wherein the flavor component includes a dried seasoning present in an amount from about 0.5% to about 10.0% (FWB).

43. The method of claim 41 wherein the flavor component includes at least one flavor resin.

44. The method of claim 43 wherein the flavor resin is present in the pasta product in an amount from about 0.1% to about 3.0% by weight.

45. The method of clam 24 further comprising drying the pasta product to a moisture content of about 12%.

* * * * *